(12) United States Patent
Sajadieh et al.

(10) Patent No.: US 6,928,046 B1
(45) Date of Patent: Aug. 9, 2005

(54) FRAME SYNCHRONIZATION OF AN OFDM SIGNAL

(75) Inventors: Masoud Sajadieh, Tinton Falls, NJ (US); Mohsen Sarraf, Rumson, NJ (US); Mohammad Hossein Zarrabizadeh, Woodbridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/304,830

(22) Filed: May 5, 1999

(51) Int. Cl.[7] .......................... H04J 11/00; H04L 27/28; H03K 9/00; H04H 5/00
(52) U.S. Cl. .................. 370/203; 375/260; 375/316; 381/3
(58) Field of Search ................. 375/260, 316, 375/350, 346, 285, 365, 364, 366, 147, 270, 277, 327; 381/3–14; 370/350, 503, 206, 203, 210

(56) References Cited

U.S. PATENT DOCUMENTS

| | | | | |
|---|---|---|---|---|
| 5,652,772 A | * | 7/1997 | Isaksson et al. | 375/367 |
| 5,745,525 A | * | 4/1998 | Hunsinger et al. | 375/285 |
| 6,160,791 A | * | 12/2000 | Bohnke | 370/208 |
| 6,188,717 B1 | * | 2/2001 | Kaiser et al. | 375/148 |
| 6,313,738 B1 | * | 11/2001 | Wynn | 340/310.03 |
| 6,341,140 B1 | * | 1/2002 | Lee et al. | 375/147 |

* cited by examiner

*Primary Examiner*—Chi Pham
*Assistant Examiner*—Ronald Abelson

(57) ABSTRACT

Frame synchronization of a received OFDM signal (such as that used in a hybrid FM DAB system) is provided by filtering out significant outer frequency portions of the digital channels, and then using cyclic extension and correlation of the cyclically extended bits (or samples). The received OFDM signal is passed through a bandpass filter to remove outer digital subcarriers (i.e., those farthest from a center frequency) from a received OFDM signal before correlating to locate the OFDM frame boundaries. By filtering out digital subcarriers within each of the digital channels, particularly those closest to adjacent channels and thus most likely to be interfered with by an adjacent first channel OFDM (or FM) signal, correlation between cyclically extended bit (or sample) patterns and thus frame synchronization of OFDM signals can be improved significantly.

11 Claims, 7 Drawing Sheets

FRAME SYNCHRONIZATION OF AN OFDM SIGNAL

BACKGROUND OF THE INVENTION

1. Field of the Invention

This invention relates generally to digital broadcasting. More particularly, it relates to a method and apparatus for reliably acquiring orthogonal frequency division multiplexing (OFDM) frame synchronization in a hybrid FM In-Band On-Channel (IBOC) system.

2. Background of Related Art

Various methods of broadcasting signals are known. In particular, a number of attempts have been made to simultaneously broadcast similar copies of the same source material on different frequencies or channels, e.g., both in digital form, and/or one in digital form and one in analog form. This technique can be advantageously employed for non-commercial broadcasts such as cellular phone transmissions, e.g., to provide for backward compatibility and/or signal redundancy, as well as for commercial broadcasts such as digital television (DTV) or radio services such as FM.

Figure 5:
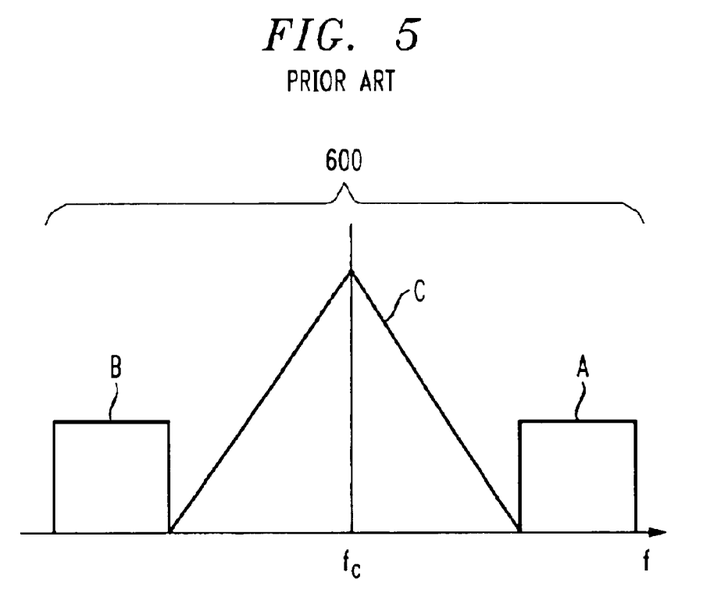
FIG. 5 shows a conventional composite signal containing analog and digital signals in the frequency domain.

For instance, FIG. 5 depicts a conventional method of simultaneously broadcasting two digital copies of the same source material along with an older standard analog waveform. In the shown example, the broadcast includes two digital broadcast signals A and B and one analog broadcast signal C transmitted in the same band on the same channel, otherwise known in the United States as an In-Band On-Channel Digital Audio Broadcast (IBOC DAB) or hybrid IBOC.

FIG. 5 shows a typical frequency spectrum of a IBOC DAB signal including two digital broadcast signals A and B as well as an analog broadcast signal C. The present invention improves the reliability in the detection of the starting point of each frame of data in the digital broadcast signals A, B.

In the disclosed example, the hybrid IBOC DAB signal 600 includes a center band containing a first, analog copy of the source material, an upper band A containing a first digital copy of the same source material, and a lower band B containing a second digital copy of the same source material.

The use of both an analog broadcast signal C and digital broadcast signals A, B allows the capability for both analog and digital receivers to receive and interpret at least one copy of the source material. In many cases, this provides backwards compatibility to analog systems as systems are replaced with more advanced digital counterpart systems.

Figure 6:
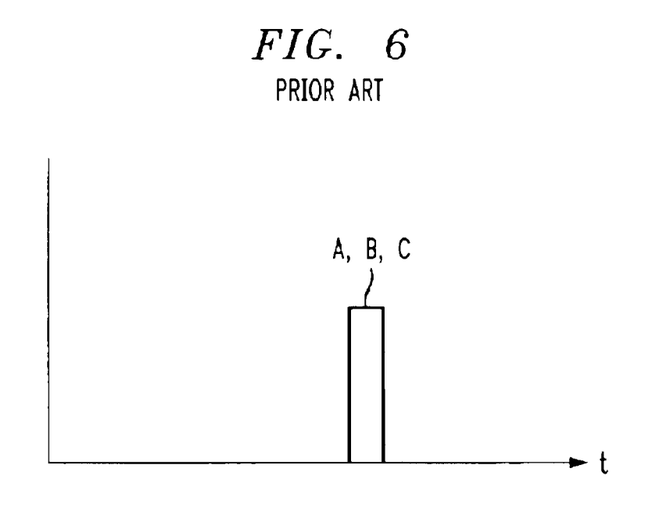
FIG. 6 shows a representation of conventional broadcasts including at least two copies of the same source material.

FIG. 6 shows that both digital broadcast signals A and B (as well as analog broadcast signal C) are conventionally transmitted at the same time. The use of two digital broadcast channels, i.e., the upper band A and the lower band B, provides system robustness and reliability in light of environmental conditions. For instance, both digital broadcast signals A and B can be received by a digital receiver and each received signal checked for errors in transmission using, e.g., a cyclic redundancy check (CRC) or check sum. If one broadcast signal A or B contains errors at any one time, the system can switch over to utilizing the second, error-free channel. This increases the reliability of the system because of the theoretically increased chances of at least one digital signal getting through to the receiver without interference or signal loss due to signal fade. Thus, in theory, the transmission of two copies of the same source material, e.g., one in the upper band A and one in the lower band B, would avoid the destructive effects of some environmental conditions such as frequency selective fading caused by a moving receiver or transmitter. It is typically advantageous to combine digital signals A and B by a soft combination method. A soft combiner combines the two channel codes on the two sidebands. These can be identical codes or preferably complementary punctured codes.

However, in reality, the present inventors have appreciated that one of the channels A or B may be disadvantageously affected by the presence of adjacent stations, causing severe interference with a digital channel A or B, resulting in erroneous detection of the starting point of each frame of digital data.

In particular, frame synchronization is performed so that properly lined up samples can be delivered to the FFT block at the receiver. If this is not done properly, a reliable link cannot be established.

Each frame of data in the OFDM signal may be, e.g., 512, 1024, 2048, etc. bits in length. A conventional technique for 'marking' the beginning point of the OFDM data frame is called "prefix extension".

Prefix extension relates to the cyclical extension of a number of bits, copied either from the end of the data frame and/or from the beginning of the data frame, and adding the same to the opposite end of the data frame. For instance, using a 512 bit data frame, the first 32 bits of the 512 bit data frame can be repeated after transmission of the 512 bits, resulting in a total transmission of 544 bits. The receiver then detects the location of the starting bit of that data frame by correlating the locations of the repeating 32 bit data pattern. In another example, bits at the end of the data frame (e.g., 16 bits) are copied and transmitted before the 512 bit data frame signal, and bits at the beginning of the data frame (e.g., 16 bits) are copied and transmitted after the 512+16= 528 bit signal. This technique provides two sets of repeating bit patterns on either end of the 512 bit data frame signal. In this example, the transmission of a 512 bit data frame requires the transmission of 512+16+16=544 bits. Repetition of bits at the beginning of each data frame and/or at the end of each data frame are known collectively as "prefix extension" or "cyclic extension".

Conventionally, frame shaping has not been performed in an IBOC hybrid FM DAB system. In the absence of any frame shaping, digital frames in each of the separate digital channels A and B in conventional DAB systems must be synchronized so that correlating data frames, e.g., 512 bit data frames, are applied to an Inverse Fast Fourier Transform (IFFT) processing block at the same time. Prefix extension relaxes the accuracy required in OFDM frame synchronization. However, digital samples in the respective digital frames of the two digital channels A and B relating to samples from the same IFFT processing should be passed to a Fast Fourier Transform (FFT) block in the receiver at the same time.

Utilizing frame shaping, the following analysis is used. Let us assume that the output complex samples of an IFFT block are $t0, t1, \ldots, t511$. The transmitted samples, therefore, will be $t0, t1, \ldots, t511, t512, \ldots, t543$, where $t512=t0, t513=t1, \ldots, t543=t31$, due to cyclic extension. Note that $t_i^* \cdot t(i+512) = E + j0 = E$, for $i=0, 1, \ldots, 31$, where E is the energy per transmitted symbol. This is due to the fact that $ti=t(i+512)$ so that there will only be a real result from the complex multiplication equal to the transmitted symbol energy. This is not true for other i's because there is no replica of them transmitted within the cyclic extension. In other words, the samples that have been cyclically extended add up in amplitude while the rest add up in power under a correlation process.

Figure 7:
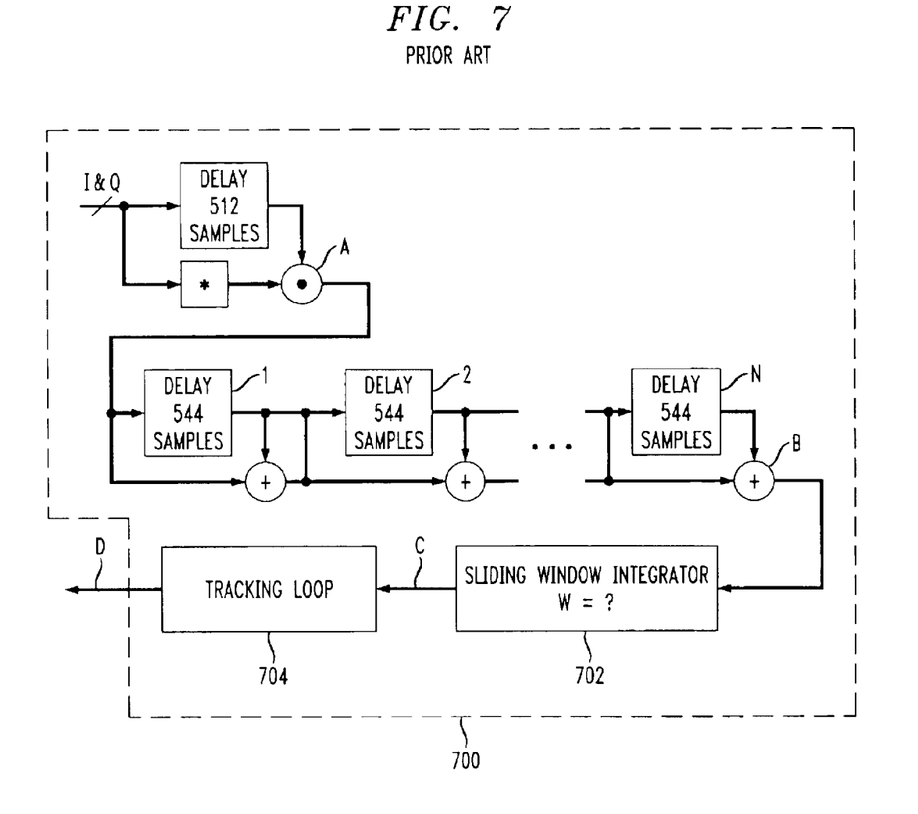
FIG. 7 depicts the integration of a plurality of cyclically extended data frames to provide a long-term tracking function to locate the starting point of subsequent data frame signals.

FIG. 7 depicts the integration of a plurality of cyclically extended data frames to provide a long-term tracking function to locate the starting point of subsequent data frame signals.

In particular, in the absence of channel impairments, there would presumably be no Quadrature-phase Q output at point A as shown in FIG. 7, and a relatively larger In-phase I output will result at point A as well. However, in the presence of channel impairments, the output levels at point A due to a similarity in samples from one OFDM symbol to the next can change. This makes a simple threshold approach useless, and thus the starting bit of an OFDM data frame must be determined as an average over several OFDM data frames as depicted in FIG. 7. Accordingly, FIG. 7 shows the use of N stages 1, 2, ... N, each comprising a delay of, e.g., 544 bits or samples, and a summer, to allow an 'integration' of the starting bit of a data frame in the sliding window integrator 702. The delays for averaging are shown in the example as having a length of 544 bits (or samples) based on the length of the cyclically extended data frame. After 544 bits (or samples) of a particular OFDM data frame (or symbol) we are at the same point in the following OFDM data frame (or symbol).

Point B, after the N stages of delay and summation, represents the summation of the contribution of N OFDM data frames (or symbols) to gain averaging power.

Now, since the contribution from the, e.g., 32 bits (or samples) that have been cyclically extended result in a higher real term output, we can locate the beginning of the OFDM data frame (or symbol) by integrating the output at point B shown in FIG. 7 over, e.g., 32 bits (or samples).

The integration is represented by a sliding window integrator 702 in FIG. 7. Upon integration, there should be a peak at the sample time corresponding to the last cyclically extended bit (or sample). In practice, integration is performed using a windowing function to minimize the effect of the outputs due to non-cyclically extended bits (or samples) in the process. A simple windowing function may be implemented to shorten the integration period to a value less than, e.g., 32 bits (or samples).

Figure 8A:
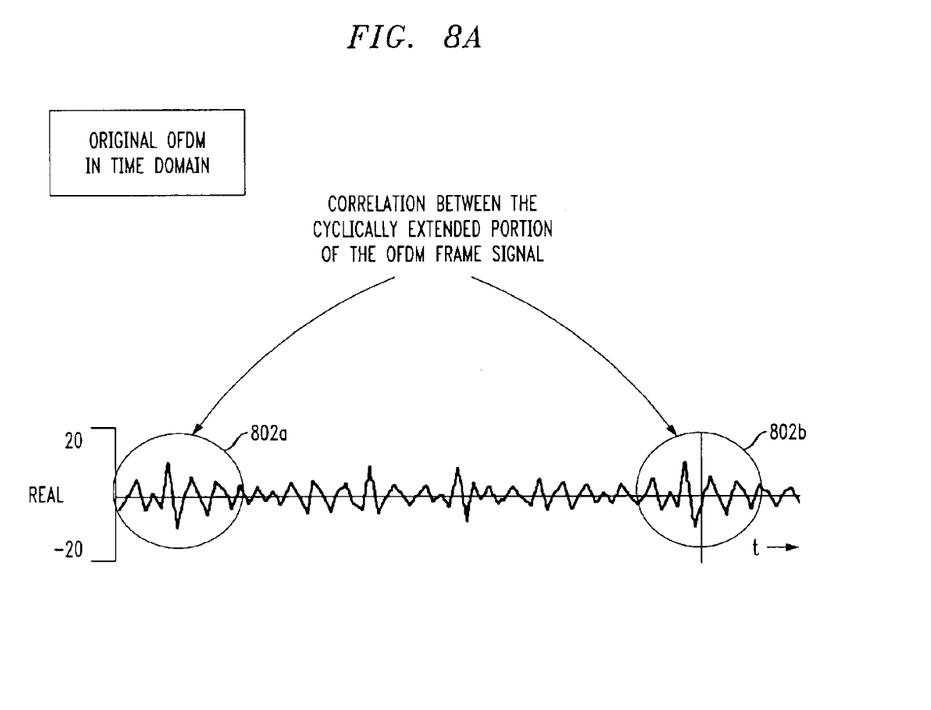
FIGS. 8A and 8B show an example of both the In-phase (I) and quadrature-phase (Q) portions of an OFDM data frame in the time domain.
Figure 8B:
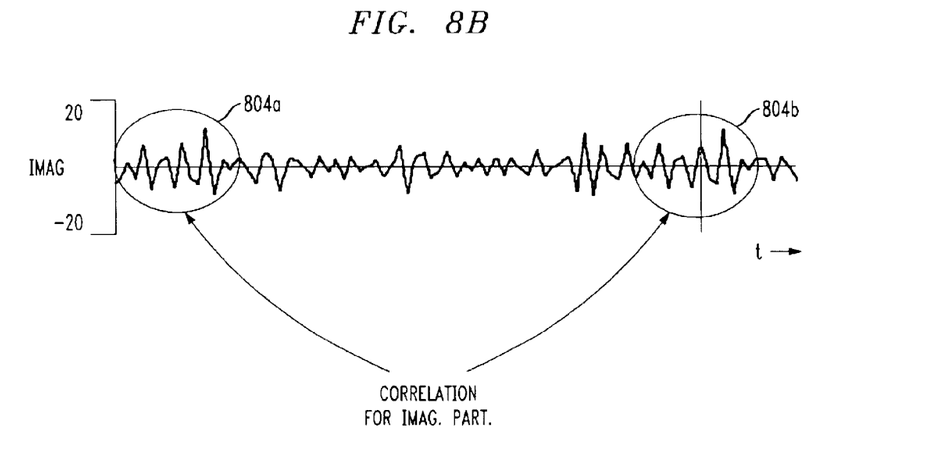

The output at point C in FIG. 7 is a random looking signal having periodic peaks, as shown in FIGS. 8A and 8B. FIGS. 8A and 8B show an example of both the In-phase (I) and quadrature-phase (Q) portions of an OFDM data frame in the time domain.

In FIGS. 8A and 8B, signal peaks occur relating to a cyclically extended portion 802a, 802b (FIG. 8A) and 804a, 804b (FIG. 8B), e.g., every 544 bits (or samples). However, each peak 802, 804 will take on a random value due to the dynamic nature of the channel. Thus, a tracking loop 704 selects the random-valued peaks 802, 804 in a way which does not lose coherence from OFDM data frame to data frame if, e.g., the peaks disappear due to severe fades.

The output of the tracking loop 704 at point D provides a periodic rectangular pulse with a duty cycle of, e.g., 1/544 at a constant peak value. A pulse train output at point D indicates the starting bit (or sample) of a received OFDM frame signal, e.g., for passage to a FFT engine in a receiver.

Such a conventional OFDM frame synchronization technique works fine in the absence of any first adjacent channels, i.e., channels occupying bandwidth immediately adjacent to that used for the transmission of the OFDM frame signals of interest. Unfortunately, in the presence of a first adjacent channel, one of the outer subcarriers (i.e., one of the digital channels A or B) will suffer from severe interference with the analog channel C of the first adjacent channel. This interference will likely cause detection and correlation of the cyclically extended bits (or samples) in the OFDM channel of interest to fail.

Figure 9:
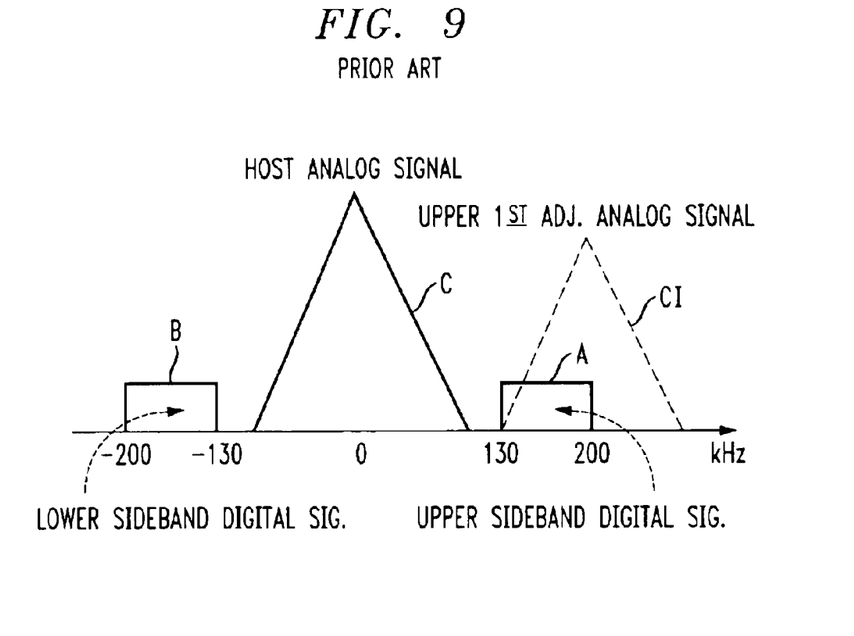
FIG. 9 shows interference between a first adjacent channel and an OFDM channel of interest.

Interference between a first adjacent OFDM channel and the OFDM channel of interest is shown in FIG. 9.

In particular, FIG. 9 shows an OFDM channel of interest comprising digital broadcast signals A and B and an analog broadcast signal C. However, the analog broadcast signal CI of a first adjacent OFDM channel overlaps one of the digital broadcast signals A. In FIG. 9, the first adjacent interfering channel is shown at the edge of coverage of the OFDM channel of interest, which is where the interference is typically the worst.

OFDM frame synchronization becomes seriously affected during the duration of the severe interference caused by the adjacent first channel with respect to the digital broadcast channel A of the OFDM channel of interest, as shown in FIG. 9, because detection of the cyclically extended bit patterns may not be adequately performed, even as averaged over a plurality of frames, because of the ever-presence of an interfering adjacent first channel.

There is thus a need for an improved OFDM frame synchronization technique capable of reliably detecting the location of a starting point of an OFDM data frame in the presence of an interfering first channel.

SUMMARY OF THE INVENTION

In accordance with the principles of the present invention, an OFDM signal frame sync signal generator comprises a bandpass filter adapted to remove a significant portion of a signal corresponding to at least one digital channel from a received OFDM signal. An OFDM frame synchronizing correlator generates a frame sync signal based on a detected correlation of a cyclically extended portion of a data frame in the received OFDM signal after processing by the bandpass filter.

A method of detecting a timing of a data frame in a received OFDM signal in accordance with the principles of the present invention comprises filtering out a significant portion of a signal corresponding to at least one digital channel from the received OFDM signal to provide a bandpass filtered OFDM signal. A cyclically extended portion of a data frame in the bandpass filtered OFDM signal is correlated. A frame sync signal is generated based on a correlation of the cyclically extended portion of the data frame.

BRIEF DESCRIPTION OF THE DRAWINGS

Features and advantages of the present invention will become apparent to those skilled in the art from the following description with reference to the drawings, in which:

FIGS. 4A and 4B show in the time domain an exemplary output of a digital bandpass filter shown in FIG. 1, filtered in accordance with the principles of the present invention. FIG. 4A shows the In-phase portion of the OFDM signal, whereas

DETAILED DESCRIPTION OF ILLUSTRATIVE EMBODIMENTS

The present invention provides frame synchronization for an OFDM signal using cyclic extension and correlation of the cyclically extended bits (or samples) after filtering out digital subcarriers from the digital channels of a received OFDM signal. The received OFDM signal is passed through a bandpass filter to remove outer (i.e., farthest from a center frequency $f_c$) digital subcarriers from a received OFDM signal before correlating to locate the OFDM frame boundaries. By filtering out digital subcarriers within each of the digital channels A and B, particularly those closest to adjacent channels and thus most likely to be interfered with by an adjacent first channel OFDM (or FM) signal, correlation between cyclically extended bit (or sample) patterns and thus frame synchronization of OFDM signals can be improved significantly.

The principles of the present invention propose a simple receiver system design such that there is no need to make decisions about adjacent interferers. In accordance with this proposition, the outer subcarriers and the analog host signal are first filtered out before attempting to perform the conventional correlation process. This filtering is performed in the digital domain, i.e., after analog-to-digital (A/D) conversion.

Figure 1:
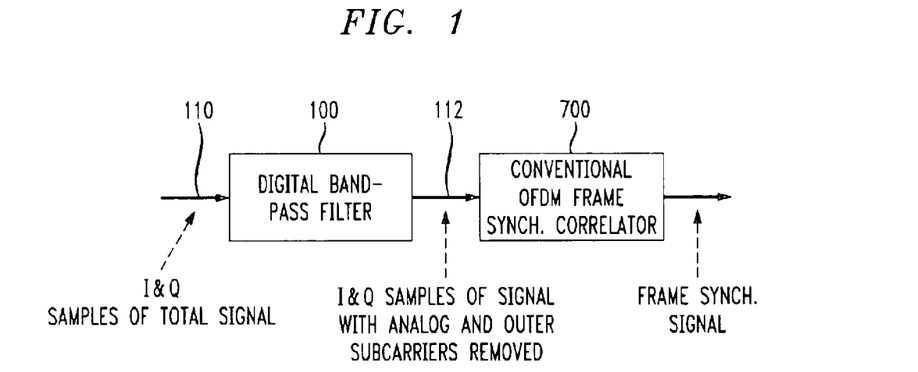
FIG. 1 shows an embodiment of the OFDM frame synchronization technique in accordance with the principles of the present invention.

FIG. 1 shows an embodiment of the OFDM frame synchronization technique in accordance with the principles of the present invention.

In particular, the In-phase I and Quadrature-phase Q portions of a received OFDM signal (e.g., an FM digital audio broadcast (DAB) system signal) are passed through a digital bandpass filter 100 before processing by a conventional OFDM frame synchronization correlator 700 (e.g., as shown in FIG. 7). The digital bandpass filter 100 filters out the lower frequency portion of a lower sideband digital channel (e.g., the lower frequency portion of the B digital channel) and/or the upper frequency portion of an upper sideband digital channel (e.g., the upper frequency portion of the A digital channel). It also will remove the analog signal C. The analog channel C is not relevant to the digital channel portions A and B, and is typically filtered out, either before being input to the digital bandpass filter 100, or as an added function of the digital bandpass filter 100.

The digital bandpass filter 100 may be a suitable processor, e.g., a microprocessor, digital signal processor (DSP), or microcontroller.

The digital bandpass filter 100 may digitally filter the received OFDM signal 110 in any suitable fashion. For instance, conventional filtering techniques may be implemented (e.g., SAW filter or other techniques). Alternatively, a simple filtering technique may be implemented wherein the number of subcarrier frequencies comprising each of the digital channels A, B may be reduced from those present in the received OFDM signal. Thus, only the inner most subcarriers of each of the digital channels A, B (i.e., those closest to the center frequency $f_c$ of the associated analog channel C) are passed on to the OFDM frame sync correlator 700, to provide in essence a bandpass filtering of the received OFDM signal before correlation of the cyclically extended bits (or samples) in the data frames of the OFDM signal.

Figure 2:
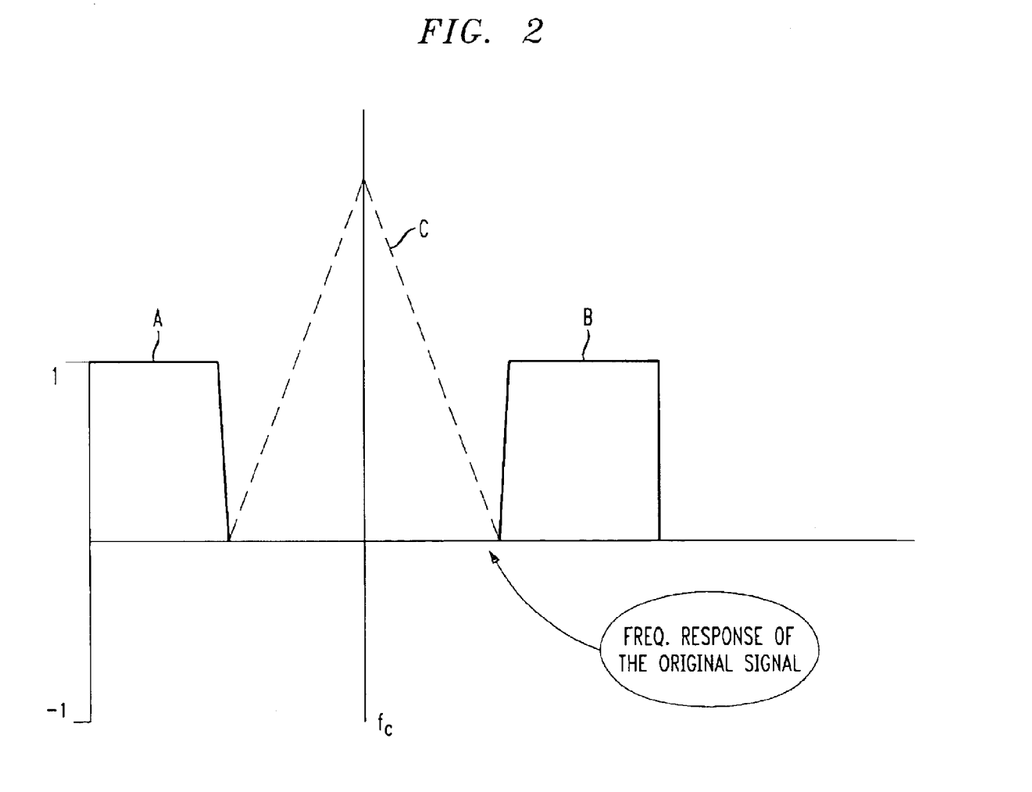
FIG. 2 shows a received OFDM signal before input to a digital bandpass filter in accordance with the principles of the present invention.
Figure 3:
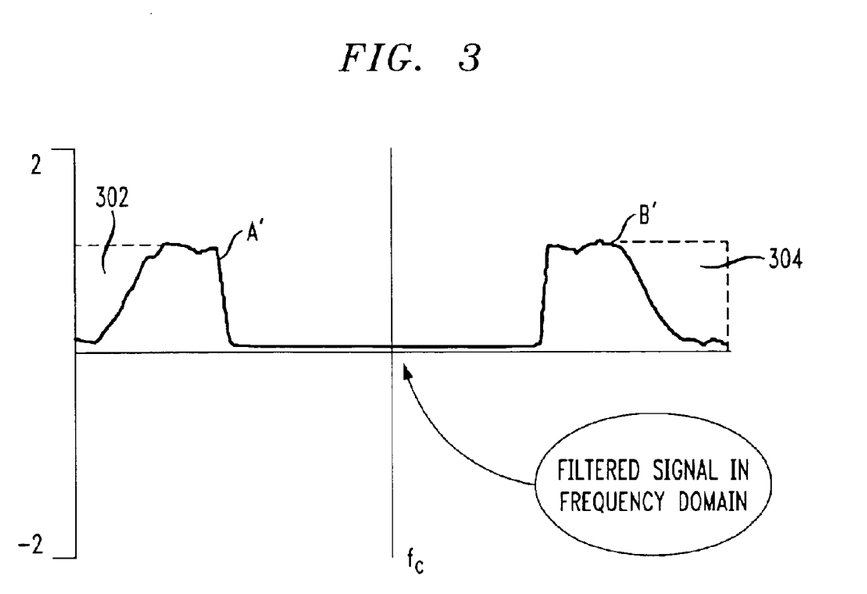
FIG. 3 shows the inventively filtered OFDM signal as it is output from a digital bandpass filter being processed for OFDM frame synchronization correlation, in accordance with the principles of the present invention.

A comparison of FIG. 2 and FIG. 3 shows the effect of the digital bandpass filter 100. FIG. 2 shows a received OFDM signal before input to the digital bandpass filter 100, and FIG. 3 shows the inventively filtered OFDM signal as it is output from the digital bandpass filter 100.

In particular, FIG. 2 shows the two digital channel portions A and B of an incoming OFDM signal 110 (FIG. 1) in the frequency domain.

FIG. 3 shows the OFDM signal after digital bandpass filtering by the digital bandpass filter 100 (FIG. 1). The bandpass filtered OFDM signal includes filtered digital channels A' and B'. Note that the outer portions 302, 304 of the digital channels A and B have been removed. It is these outer portions 302, 304 which are determined to be the most prone to interference by adjacent channels. Thus, removal of portions 302, 304 removes a significant portion of interference caused (or likely to be caused) by an adjacent channel.

Figure 4A:
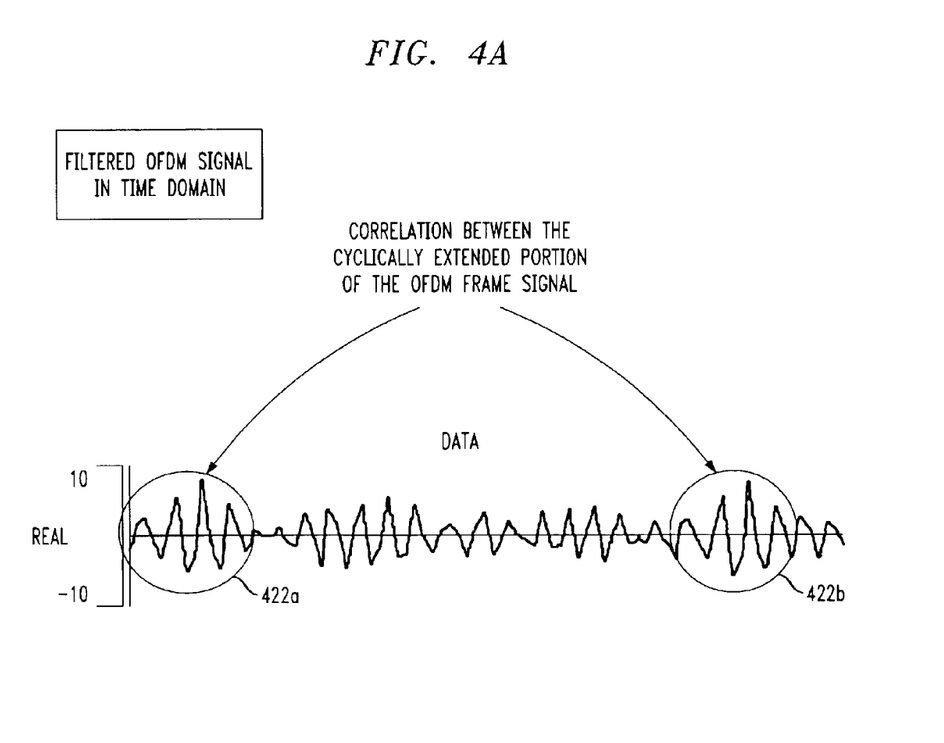
Figure 4B:
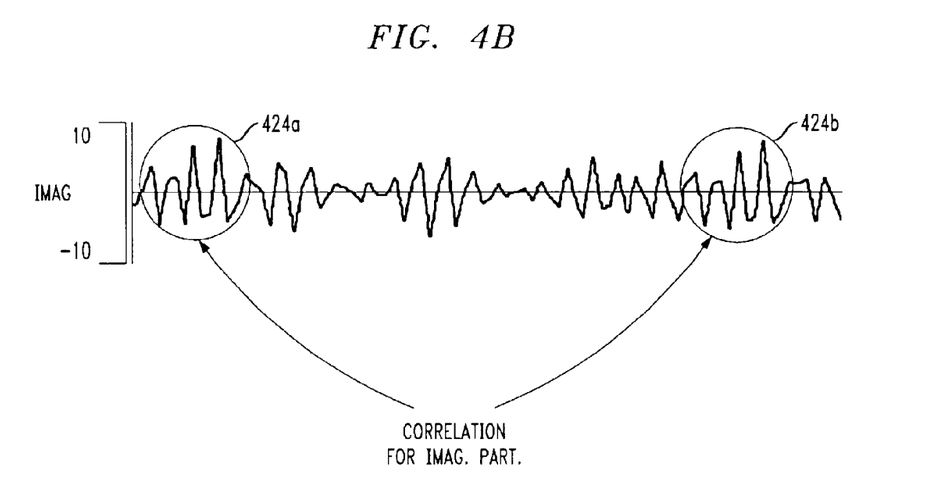
FIG. 4B shows the Quadrature-phase portion of the OFDM signal.

FIGS. 4A and 4B show in the time domain an exemplary output of the digital bandpass filter 100 (FIG. 1). Note that despite the removal of significant portions 302, 304 (FIG. 3) of the digital channels A and B, correlation can still be determined between the cyclically extended portions 422a, 422b and 424a, 424b of both the In-phase I signal and the Quadrature-phase Q signal as shown in FIGS. 4A and 4B, respectively.

Note that in FIGS. 4A and 4B, there is an increase in the noise floor in comparison to the conventional, unfiltered OFDM signal in the time domain signal shown in FIGS. 8A and 8B. Removal of the outer portions of the digital OFDM channels A, B results in greater quantization noise in the resulting OFDM signal. Thus, there is a direct relationship between the amount of the outer portions of the digital OFDM channels removed by digital bandpass filtering, and noise in the resulting OFDM signal. Thus, the frequency range filtered out of the digital channels A and/or B will be dependent upon the particular application, e.g., the closeness of adjacent channels, the power level of adjacent channels, etc. However, particularly in the presence of interfering adjacent channels, it has been determined that correlation of cyclically extended portions of an OFDM data frame can nevertheless be performed with significantly increased quantization noise caused by the bandpass filtering of the received OFDM signal in accordance with the principles of the present invention.

Removal of the outer portions of the digital OFDM channels A, B in accordance with the principles of the present invention relates to the detection of a frame sync signal, and not necessarily to the processing of the content of the OFDM channel. Thus, the entire content of the digital OFDM channels A, B as received may be processed without bandpass filtering.

While the invention has been described with reference to the exemplary embodiments thereof, those skilled in the art will be able to make various modifications to the described embodiments of the invention without departing from the true spirit and scope of the invention.

What is claimed is:

1. An orthogonal frequency division multiplexing (OFDM) signal frame sync signal generator, comprising:

a bandpass filter adapted to remove a portion but not all of a signal corresponding to at least one digital channel from a received OFDM signal; and an OFDM frame synchronizing correlator adapted to generate a frame sync signal based on a detected correlation of a cyclically extended portion of a data frame in said received OFDM signal after processing by said bandpass filter;

wherein said bandpass filter is adapted to remove a significant portion of each of two digital channels from said received OFDM signal, said portion of said two digital channels being respective portions in a frequency domain farthest from a center frequency of an analog channel contained in said received OFDM signal.

2. The OFDM signal frame sync signal generator according to claim 1, wherein:

said portion of said at least one digital channel is a portion in a frequency domain farthest from a center frequency of an analog channel contained in said received OFDM signal.

3. An orthogonal frequency division multiplexing (OFDM) signal frame sync signal generator, comprising:

a bandpass filter adapted to remove a portion of a signal corresponding to at least one digital channel from a received OFDM signal; and an OFDM frame synchronizing correlator adapted to generate a frame sync signal based on a detected correlation of a cyclically extended portion of a data frame in said received OFDM signal after processing by said bandpass filter;

wherein said bandpass filter is adapted to remove a significant portion of each of two digital channels from said received OFDM signal, said portion of said two digital channels being respective portions in a frequency domain farthest from a center frequency of an analog channel contained in said received OFDM signal.

4. The OFDM signal frame sync signal generator according to claim 1, wherein:

said bandpass filter is a digital bandpass filter.

5. The OFDM signal frame sync signal generator according to claim 1, wherein:

said OFDM frame synchronizing correlator generates said frame sync signal based on an integrated detection of respectively correlated cyclically extended portions of a plurality of data frames.

6. A method of detecting a timing of a data frame in a received orthogonal frequency division multiplexing (OFDM) signal, comprising:

filtering out a portion but not all of a signal corresponding to at least one digital channel from said received OFDM signal to provide a bandpass filtered OFDM signal, said portion being in a frequency domain farthest from a center frequency of an analog channel contained in said received OFDM signal;

correlating a cyclically extended portion of a data frame in said bandpass filtered OFDM signal; and generating a frame sync signal based on a correlation of said cyclically extended portion of said data frame.

7. The method of detecting a timing of a data frame in a received OFDM signal according to claim 6, wherein said filtering comprises:

digitally filtering.

8. The method of detecting a timing of a data frame in a received OFDM signal according to claim 6, wherein:

said correlating correlates respective cyclically extended portions of a plurality of data frames in said bandpass filtered OFDM signal.

9. Apparatus for detecting a timing of a data frame in a received orthogonal frequency division multiplexing (OFDM) signal, comprising:

means for filtering out a portion but not all of a signal corresponding to at least one digital channel from said received OFDM signal to provide a bandpass filtered OFDM signal, said portion being in a frequency domain farthest from a center frequency of an analog channel contained in said received OFDM signal;

means for correlating a cyclically extended portion of a data frame in said bandpass filtered OFDM signal; and means for generating a frame sync signal based on a correlation of said cyclically extended portion of said data frame.

10. The apparatus for detecting a timing of a data frame in a received OFDM signal according to claim 9, wherein said means for filtering comprises:

means for digitally filtering said received OFDM signal.

11. The apparatus for detecting a timing of a data frame in a received OFDM signal according to claim 9, wherein:

said means for correlating correlates respective cyclically extended portions of a plurality of data frames in said bandpass filtered OFDM signal.

* * * * *